(12) United States Patent
Georgin (10) Patent No.: US 12,162,456 B2
(45) Date of Patent: Dec. 10, 2024

(54) FEEL ADJUSTMENT BRAKING SYSTEMS AND METHODS

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 315 days.

(21) Appl. No.: 17/531,602

(22) Filed: Nov. 19, 2021

(65) Prior Publication Data

US 2023/0159011 A1     May 25, 2023

(51) Int. Cl.
*B60T 8/17*     (2006.01)
*B64C 25/44*     (2006.01)

(52) U.S. Cl.
CPC ............ *B60T 8/1703* (2013.01); *B64C 25/44* (2013.01); *B60T 2220/04* (2013.01)

(58) Field of Classification Search
CPC ... B60T 8/1703; B60T 2220/04; B64C 25/44; G05D 1/0202; G05D 1/437; G05D 1/439
See application file for complete search history.

(56) References Cited

U.S. PATENT DOCUMENTS

| | | | | |
|---|---|---|---|---|
| 4,923,253 A * | 5/1990 | Pollner | ............ | B64F 1/227 244/50 |
| 5,050,940 A * | 9/1991 | Bedford | ............ | B60T 8/1703 303/68 |
| 5,217,282 A * | 6/1993 | Guichard | ............ | B60T 17/18 303/20 |
| 5,417,477 A * | 5/1995 | Lasbleis | ............ | B64C 25/42 303/3 |
| 5,845,975 A * | 12/1998 | Wells | ............ | B64C 25/42 244/110 A |
| 6,398,162 B1 * | 6/2002 | Stimson | ............ | B60T 8/00 188/264 R |
| 6,402,259 B2 * | 6/2002 | Corio | ............ | B64C 25/42 701/76 |
| 6,851,649 B1 * | 2/2005 | Radford | ............ | B60T 8/325 188/264 R |
| 7,165,816 B2 * | 1/2007 | DeVlieg | ............ | B60T 8/325 303/155 |
| 7,524,000 B2 * | 4/2009 | Yamamoto | ............ | B60T 17/221 303/199 |
| 7,963,620 B2 * | 6/2011 | DeVlieg | ............ | B60T 17/221 303/174 |
| 8,332,114 B2 * | 12/2012 | Whittingham | ............ | B60T 8/1703 701/119 |
| 8,386,094 B2 | 2/2013 | DeVlieg et al. | | |

(Continued)

OTHER PUBLICATIONS

European Patent Office, European Search Report dated Mar. 17, 2023 in Application No. 22208516.9.

*Primary Examiner* — Angelina M Shudy
(74) *Attorney, Agent, or Firm* — SNELL & WILMER L.L.P.

(57) ABSTRACT

A method of taxiing an aircraft may comprise determining, via a controller, whether the aircraft is taxiing with fewer brakes active than a total number of brakes; and modifying, via the controller, a brake pressure supplied to an active brake of the aircraft as a function of pedal deflection in response to determining the aircraft is taxiing with fewer brakes active relative to the total number of brakes.

16 Claims, 8 Drawing Sheets

(56) References Cited

U.S. PATENT DOCUMENTS

| | | | | |
|---|---|---|---|---|
| 8,548,652 B2* | 10/2013 | DeVlieg | | B60T 8/00 188/73.1 |
| 9,061,661 B2* | 6/2015 | Vaney | | B60T 8/00 |
| 9,126,572 B2* | 9/2015 | Vaney | | B60T 8/1703 |
| 9,809,302 B2* | 11/2017 | Howell | | B60T 8/1703 |
| 9,815,443 B2* | 11/2017 | Miller | | B64C 25/42 |
| 9,855,835 B1* | 1/2018 | Sneddon | | B60K 6/12 |
| 9,914,442 B2* | 3/2018 | Kanemori | | B60T 8/1703 |
| 10,017,165 B2* | 7/2018 | Böhm | | B60T 8/172 |
| 10,953,861 B2* | 3/2021 | Brüggemann | | B64C 25/44 |
| 11,364,884 B2* | 6/2022 | Georgin | | B60T 8/1703 |
| 11,548,625 B2* | 1/2023 | Arsenault | | B64C 25/44 |
| 11,572,045 B2* | 2/2023 | Gadd | | B64C 25/42 |
| 2004/0065776 A1* | 4/2004 | DeVlieg | | B60T 8/325 244/111 |
| 2005/0231030 A1* | 10/2005 | Frank | | B64C 25/426 303/126 |
| 2006/0186267 A1* | 8/2006 | Steiner | | B60T 8/1703 244/110 A |
| 2006/0226698 A1* | 10/2006 | Riebe | | B60T 8/1703 188/162 |
| 2006/0244310 A1* | 11/2006 | DeVlieg | | B60T 17/221 303/155 |
| 2008/0071432 A1* | 3/2008 | Devlieg | | B60T 8/00 701/3 |
| 2008/0201025 A1* | 8/2008 | Dellac | | B60T 8/1703 701/3 |
| 2008/0255744 A1* | 10/2008 | Yasui | | B60T 13/686 701/70 |
| 2009/0210126 A1* | 8/2009 | Dellac | | B64C 25/48 701/70 |
| 2009/0276133 A1* | 11/2009 | May | | B64C 25/46 188/1.11 E |
| 2010/0222942 A1* | 9/2010 | Devlieg | | B60T 8/1703 701/3 |
| 2010/0286881 A1* | 11/2010 | Cahill | | F16D 66/026 701/70 |
| 2011/0278915 A1* | 11/2011 | DeVlieg | | B64C 25/44 701/3 |
| 2012/0130613 A1* | 5/2012 | DeVlieg | | B60T 17/18 701/70 |
| 2012/0145490 A1* | 6/2012 | Clary | | B60T 8/1703 188/106 P |
| 2013/0175403 A1* | 7/2013 | Spray | | B60T 8/1703 244/110 A |
| 2014/0180505 A1 | 6/2014 | Vaney et al. | | |
| 2015/0088371 A1* | 3/2015 | Kanemori | | B64C 25/42 701/33.9 |
| 2015/0129368 A1* | 5/2015 | Cahill | | F16D 65/14 188/71.5 |
| 2016/0200299 A1* | 7/2016 | Böhm | | B60T 13/745 303/9.62 |
| 2017/0021920 A1* | 1/2017 | Drennen | | B64C 25/44 |
| 2017/0174196 A1* | 6/2017 | Blattert | | B60T 8/4086 |
| 2017/0197606 A1* | 7/2017 | Kipp | | B60T 8/885 |
| 2018/0079402 A1* | 3/2018 | Brüggemann | | B64C 25/426 |
| 2018/0237131 A1* | 8/2018 | Cahill | | B60T 8/1763 |
| 2019/0092297 A1* | 3/2019 | Ayichew | | B60T 13/662 |
| 2020/0023949 A1* | 1/2020 | Cahill | | B64C 25/42 |
| 2021/0065482 A1* | 3/2021 | Panigrahi | | G06N 3/08 |
| 2021/0179040 A1* | 6/2021 | Hwang | | B60T 13/52 |
| 2021/0276698 A1* | 9/2021 | Vijay | | B64C 25/26 |
| 2021/0362699 A1* | 11/2021 | Landers | | B64C 25/46 |
| 2022/0041145 A1* | 2/2022 | Landers | | B64C 25/46 |
| 2022/0185460 A1* | 6/2022 | Miller | | B64C 25/426 |
| 2023/0104274 A1* | 4/2023 | Umemoto | | A01B 69/008 701/50 |

* cited by examiner

FEEL ADJUSTMENT BRAKING SYSTEMS AND METHODS

FIELD

The present disclosure relates to control systems and methods modifying braking and, more particularly, modifying braking systems and method while taxiing with a limited number of active brakes.

BACKGROUND

For carbon brakes, a large portion of brake wear (e.g., approximately 81% of total brake wear during a life of the carbon brake) is due to braking events during taxiing with cold brakes. To limit wear, methods rely on activating only a limited number of brakes. This provides sufficient braking under normal taxi conditions. Because a limited number of brakes are activated during pedal application by the pilot, this causes a change of feel in brake response and efficacy that is noticeable to the pilot. The change in feel could cause the pilot to think that the brake system is not functioning properly.

SUMMARY

A method of taxiing an aircraft is disclosed herein. The method may comprise: determining, via a controller, whether the aircraft is taxiing with fewer brakes active than a total number of brakes; and modifying, via the controller, a brake pressure supplied to an active brake of the aircraft as a function of pedal deflection in response to determining the aircraft is taxiing with fewer brakes active relative to the total number of brakes.

In various embodiments, modifying the brake pressure further comprises commanding a first brake pressure be supplied at a first pedal displacement to the active brake that is greater than a second pressure that is supplied at the first pedal displacement of the active brake in response to the total number of brakes being active. Modifying the brake pressure may comprise scaling the brake pressure over a predetermined range of pedal displacement based on a ratio of the total number of brakes to a total number of active brakes. The predetermined range of pedal displacement may be above an idle pedal threshold. Modifying the brake force may further comprise commanding a first brake force be supplied at a first pedal displacement to the active brake that is greater than a second force that is supplied at the first pedal displacement of the active brake in response to the total number of brakes being active. The method may further comprise determining a number of active brakes relative to the total number of brakes. The method may further comprise scaling the pressure (or force in the case of an electric brake) supplied to the active brake based on the number of active brakes relative to the total pressure.

An article of manufacture is disclosed herein. The article of manufacture may include a tangible, non-transitory computer-readable storage medium having instructions stored thereon that, in response to execution by a processor, cause the processor to perform operations comprising: determining, by the processor, that a number of active brakes are fewer than a total number of brakes for an aircraft during a taxiing event; and modifying, by the processor, a brake pressure supplied to an active brake in the number of active brakes as a function of pedal displacement based on the number of active brakes relative to the total number of brakes.

In various embodiments, the brake pressure supplied to the active brake as the function of pedal displacement is scaled based on a ratio of the total number of brakes to the total number of active brakes. The brake pressure may be scaled over a range of pedal displacements.

The brake pressure supplied to the active brake for a first pedal displacement of a first pedal may be equal to a second brake pressure supplied to a second active brake for a second pedal displacement of a second pedal in response to the first pedal displacement being equal to the second pedal displacement. The operations may further comprise determining whether the aircraft is taxiing. Modifying the brake force may further comprise commanding a first brake force be supplied at a first pedal displacement to the active brake that is greater than a second force that is supplied at the first pedal displacement of the active brake in response to the total number of brakes being active.

A system is disclosed herein. The system may comprise: a plurality of brakes including: a left landing gear outboard brake coupled to a left landing gear of an aircraft; a left landing gear inboard brake coupled to the left landing gear of the aircraft; a right landing gear outboard brake coupled to a right landing gear of the aircraft; and a right landing gear inboard brake coupled to the right landing gear of the aircraft; and a brake control unit (BCU) in electronic communication with the plurality of brakes, wherein the BCU performs operations comprising: determining, by the BCU, that at least one of the plurality of brakes is inactive; and modifying, by the BCU, a brake pressure supplied to each active brake in a plurality of active brakes as a function of pedal displacement based on a number of active brakes relative to a total number of brakes.

In various embodiments, the BCU is further configured to determine that the at least one of the plurality of brakes is inactive to improve wear performance. The BCU may be further configured to determine that at least two of the plurality of brakes are inactive. The brake pressure supplied to each active brake in the plurality of active brakes as the function of pedal displacement may be scaled based on a ratio of the total number of brakes to the number of active brakes. The brake pressure may be scaled over a predetermined range of pedal displacements.

The operations may further comprise determining the aircraft is taxiing. The operations may further comprise reverting to a typical braking operation in response to each brake in the plurality of brakes becoming active.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In order to reduce wear of carbon brakes during a taxiing event, aircrafts may operate with fewer than a total number of available brakes. In this regard, the carbon brakes may heat up more quickly and wear fewer due to the increased heat. With the reduction active brakes being utilized, a pilot may think that the brake system is not acting properly and react accordingly. Thus, the systems and methods disclosed herein are configured to provide a pilot with a similar feel to normal braking operations when operating with fewer brakes than the total number of active brakes, in accordance with various embodiments.

Figure 1:
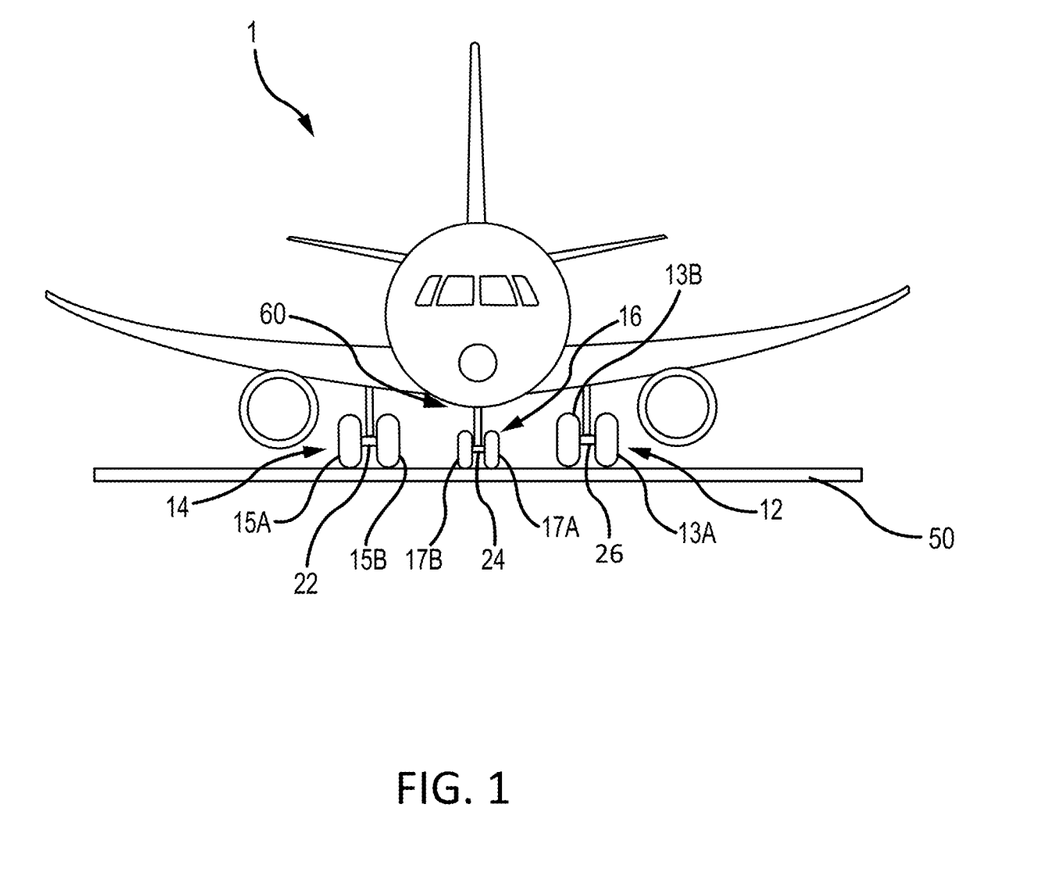
FIG. 1 illustrates an aircraft having multiple landing gear and brakes, in accordance with various embodiments.

In various embodiments, and with reference to FIG. 1, a front view of an aircraft 1 on a runway 50 is depicted. Aircraft 1 may include landing gear such as a left main landing gear (LMLG) 12, a right main landing gear (RMLG) 14, and a nose landing gear (NLG) 16. LMLG 12, RMLG 14, and NLG 16 may generally support aircraft 1 when aircraft 1 is not flying, allowing aircraft 1 to taxi, take off and land without damage. LMLG 12 may include an outboard wheel 13A and an inboard wheel 13B coupled by a strut 26; RMLG 14 may include an outboard wheel 15A and an inboard wheel 15B coupled by a strut 22; and NLG 16 may include a nose wheel 17A and a nose wheel 17B coupled by a strut 24. The nose wheels differ from the main wheels in that the nose wheels may not include a brake, in accordance with various embodiments. In various embodiments, aircraft 1 may comprise any number of landing gears and each landing gear may comprise any number of wheels.

Aircraft 1 may also include a primary braking system 60, which may be applied to any wheel of any landing gear. Braking system 60 of aircraft 1 may comprise a collection of subsystems that produce output signals for controlling the braking force and/or torque applied at each wheel (e.g., outboard wheel 13A, inboard wheel 13B, outboard wheel 15A, inboard wheel 15B, nose wheel 17A, and/or nose wheel 17B), together with various brakes, as discussed further herein. Braking system 60 may communicate with the brakes of each landing gear (e.g., LMLG 12, RMLG 14, and/or NLG 16), and each brake may be mounted to each wheel to apply and release braking force on one or more wheels (e.g., as described herein).

Aircraft wheel and brake assemblies may typically include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, brake selection logic) controls the amount of fluid pressure provided to the actuator ram, and thus, the braking force applied to the wheel.

In electric brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Figure 2:
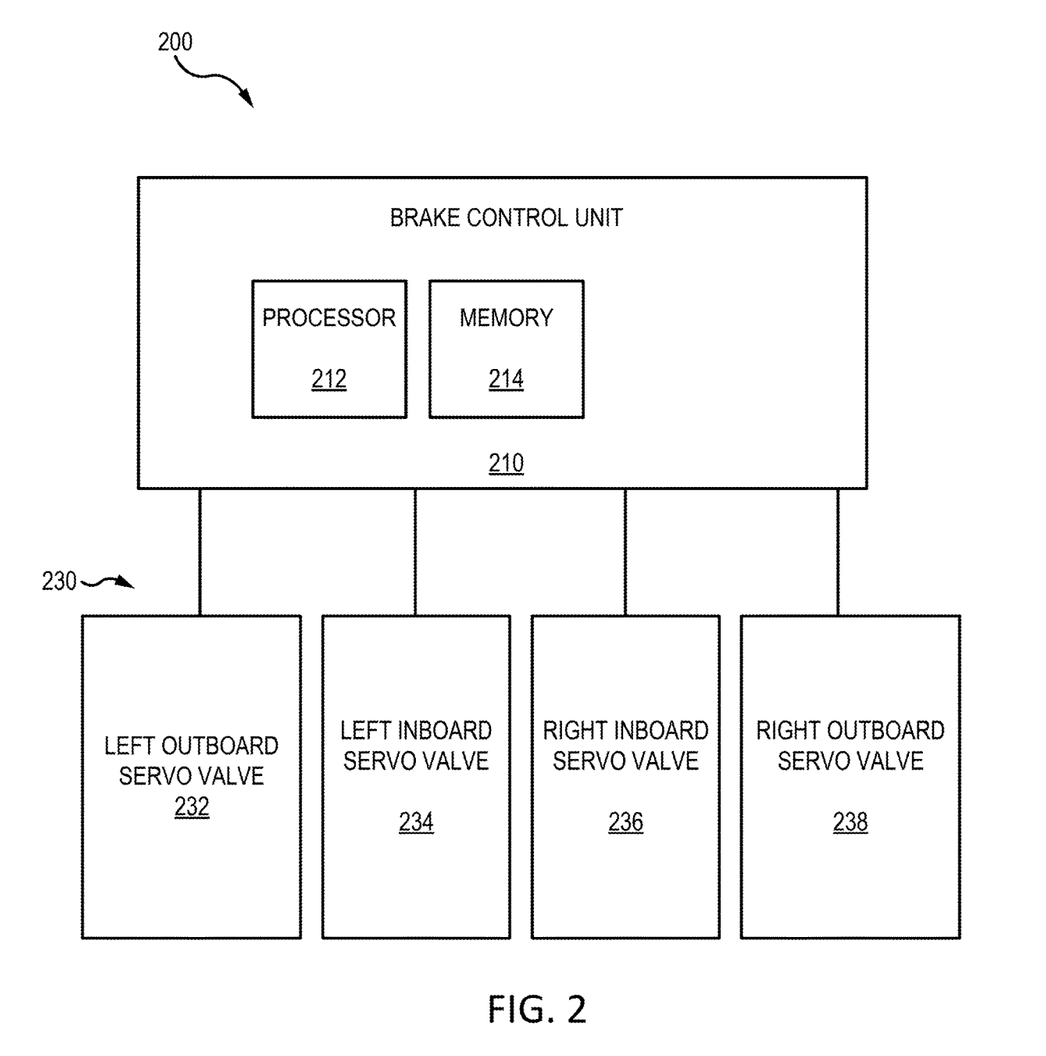
FIG. 2 illustrates a system for controlling a brake, in accordance with various embodiments.

In various embodiments, and with reference to FIG. 2, an aircraft braking system 200 is disclosed. Aircraft braking system 200 may be configured to select a number of brakes to be utilized for an aircraft (e.g., aircraft 1 of FIG. 1) during a taxiing phase and, in response to selecting the number of brakes, modify a pressure supplied to the brakes relative to a pedal deflection during the taxiing. In that respect, aircraft braking system 200 may control brake selection, for example, whether an outboard brake or and inboard brake is used for taxiing, and modify a pressure supplied to the selected brakes in response to the brake selection, in accordance with various embodiments. Aircraft braking system 200 may be configured to select between exclusive use of an inboard or outboard brake prior to a taxi event, select any number of brakes for use during a taxi event or the like. For example, an inboard brake of a landing gear assembly may be chosen prior to an aircraft taxiing based on having less wear than an outboard brake of the landing gear assembly. During taxi, the aircraft braking system 100 can modify a pressure supplied to each brake based on the number of brakes selected previously. In this regard, a feel for a pilot of an aircraft (e.g., aircraft 1 from FIG. 1) may remain constant regardless of a number of brakes used, in accordance with various embodiments.

Furthermore, aircraft braking system 200 may be used to control, for example, four or more aircraft wheels (e.g., outboard wheel 13A, inboard wheel 13B, outboard wheel 15A, inboard wheel 15B, of FIG. 1). Aircraft braking system 200 may be configured to select a single wheel from LMLG 12 and a single wheel from RMLG 14 for use during taxiing to maintain differential braking. Any number and configuration of wheels controlled by aircraft braking system 200 is within the scope of the present disclosure, as described further herein.

In various embodiments, aircraft braking system 200 may also be integrated into computer systems onboard an aircraft (e.g., aircraft 1 of FIG. 1) such as, for example, a brake control unit (BCU), a full authority digital engine control (FADEC), an engine-indicating and crew-alerting system (EICAS), and/or the like. Aircraft braking system 200 may also be a standalone computer system separate from the aircraft and in electronic communication with the aircraft, as described in further detail herein. Aircraft braking system 200 may include one or more processors and/or one or more tangible, non-transitory memories and be capable of implementing logic.

As described herein, each "controller", and/or the like may also comprise an individual processor and/or one or more tangible, non-transitory memories and be capable of implementing logic. In various embodiments, each controller, and/or the like may also be implemented in a single processor (e.g., aircraft braking system 200 may comprise a single processor). Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, aircraft braking system 200 may comprise a processor 212 configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, aircraft braking system 200 may comprise a brake control unit (BCU) 210 in operative communication with a plurality of servo valves 230. A number of servo valves in the plurality of servo valves 230 corresponds to a number of brakes for the aircraft braking system 200.

For example, FIG. 2 illustrates an aircraft braking system 200 with four servo valves corresponding to four brakes (a left outboard servo valve 232, a left inboard servo valve 234, a right inboard servo valve 236, and a right outboard servo valve 238. However, the present disclosure is not limited in this regard and any number servo valve/brake combinations is within the scope of this disclosure.

In various embodiments, and with brief reference to FIG. 1, LMLG 12 and RMLG 14 may each comprise two or more wheels. For example, LMLG 12 may comprise an axle comprising a left outboard brake with the left outboard servo valve 232 and a left inboard brake with the left inboard servo valve 234. Similarly, RMLG 14 may comprise an axle comprising a right inboard brake with the right inboard servo valve 236 and a right outboard brake with the right outboard servo valve 238. The BCU 210 may be electronically coupled to the plurality of servo valves 230.

In various embodiments, BCU 210 may comprise various components to aid in selecting an inboard or outboard brake for a respective landing gear and determining a brake pressure to supply to each servo valve in the selected servo valves relative to a pedal displacement based on the number of selected brakes. For example, BCU 210 may comprise a computing device (e.g., processor 212) and an associated memory 214. Processor 212 may comprise any suitable processor, such as, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof. Memory 214 may comprise an article of manufacture including a tangible, non-transitory computer-readable storage medium having instructions stored thereon that, in response to execution by the computing device (e.g., processor 212), cause the computing device to perform various methods, as discussed further herein.

In various embodiments, each servo valve in the plurality of servo valves 230 controls the amount of fluid pressure provided to the actuator ram, and thus, the braking force applied to the wheel of the respective servo valve as described further herein.

Figure 3:
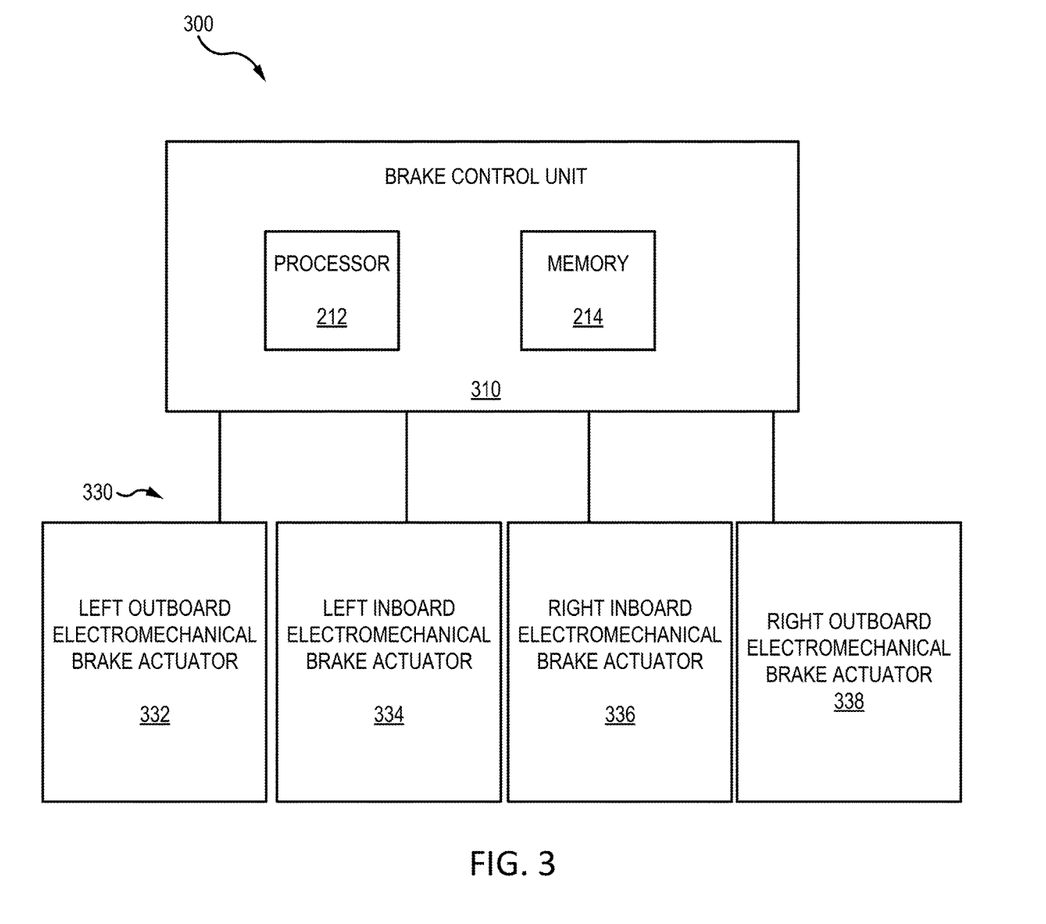
FIG. 3 illustrates a system for controlling a brake, in accordance with various embodiments.

In various embodiments, the methods and systems disclosed herein are not limited to fluid powered brake systems. For example, with reference now to FIG. 3, an aircraft braking system 300 with electronic brakes is illustrated, in accordance with various embodiments. For example, the aircraft braking system may comprise a plurality of electromechanical brake actuators 330. Although illustrated as being directly controlled by the BCU 310, each electromechanical brake actuator (e.g., left outboard electromechanical brake actuator 332, left inboard electromechanical brake actuator 334, right inboard electromechanical brake actuator 336, and right outboard electromechanical brake actuator 338) may be controlled locally by an EMAC in electronic communication with the BCU 310. The present disclosure is not limited in this regard.

Figure 4:
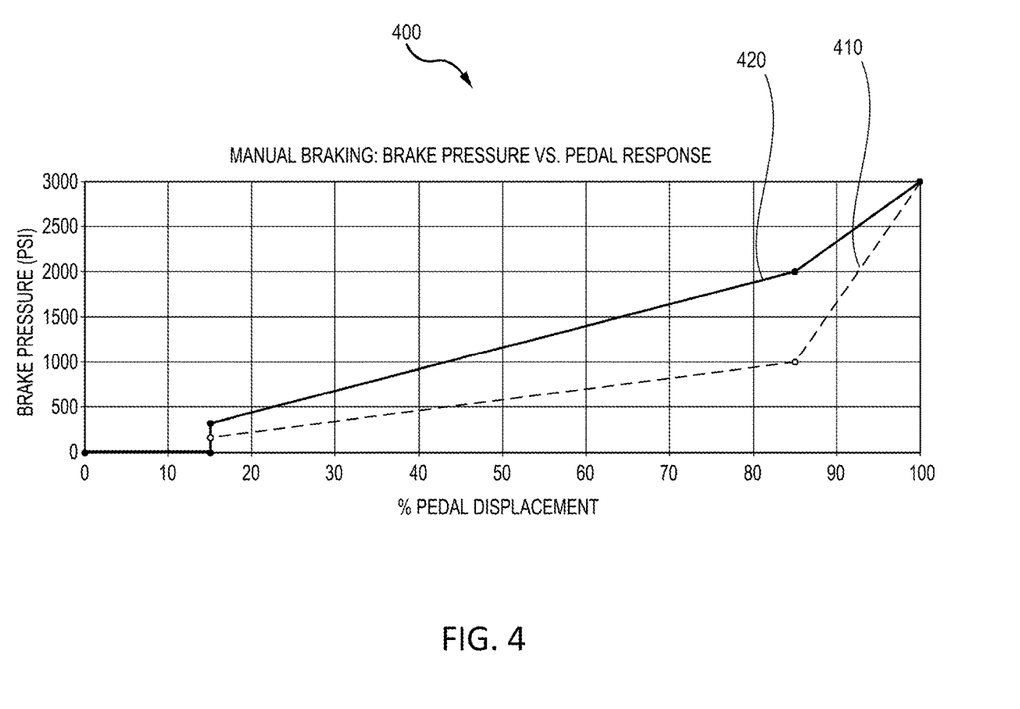
FIG. 4 illustrates a brake pressure vs. pedal response curve for a taxiing method, in accordance with various embodiments.

Referring now to FIG. 4, a plot of brake pressure as a function of pedal response for a braking system with all brakes active (plot 410) compared to a braking system with half of the brakes active (plot 420) is illustrated, in accordance with various embodiments. In order to maintain a similar pedal feel for a respective pilot during taxiing and while a brake wear reduction method is active, as discussed previously herein, a pressure supplied to a respective brake per percent of pedal deflection is modified based on a number of brakes active. For example, if only two brakes are used (e.g., a left inboard brake with left inboard servo valve 234 from FIG. 2 or a left inboard electromechanical brake actuator 334 from FIG. 3 and a right inboard brake with a right inboard servo valve 236 from FIG. 2 or a right inboard brake with a right inboard electromechanical brake actuator 336) out of a total of four potential brakes being active, a pressure or force curve (i.e., force supplied by active electromechanical brake actuators in the case of electric brakes) may be scaled by a factor of 2 for a range of pedal displacement (e.g., from 15% to 85% pedal displacement), in accordance with various embodiments. An initial range of pedal displacement (e.g., between 0% and 15%) may remain approximately 0 and an end range of pedal displacement (e.g., from 85% to 100%) may converge to a maximum supply pressure or maximum force. The initial range of pedal displacement may end at an "idle pressure or force threshold", or a minimum pedal displacement for which brake pressure begins to be supplied or brake force begins to be applied. The level of scaling at an end of the pressure or force curve may be sufficient in many applications because typically if a pilot presses a pedal above a threshold pedal displacement (e.g., 85% pedal displacement), a pilot often intends to apply full braking capability (e.g., approximately maximum pressure or maximum force). In various embodiments, force curves as disclosed herein would look similar to the pressure curves shown in FIG. 4 with force on the Y-axis as opposed to pressure.

Figure 5:
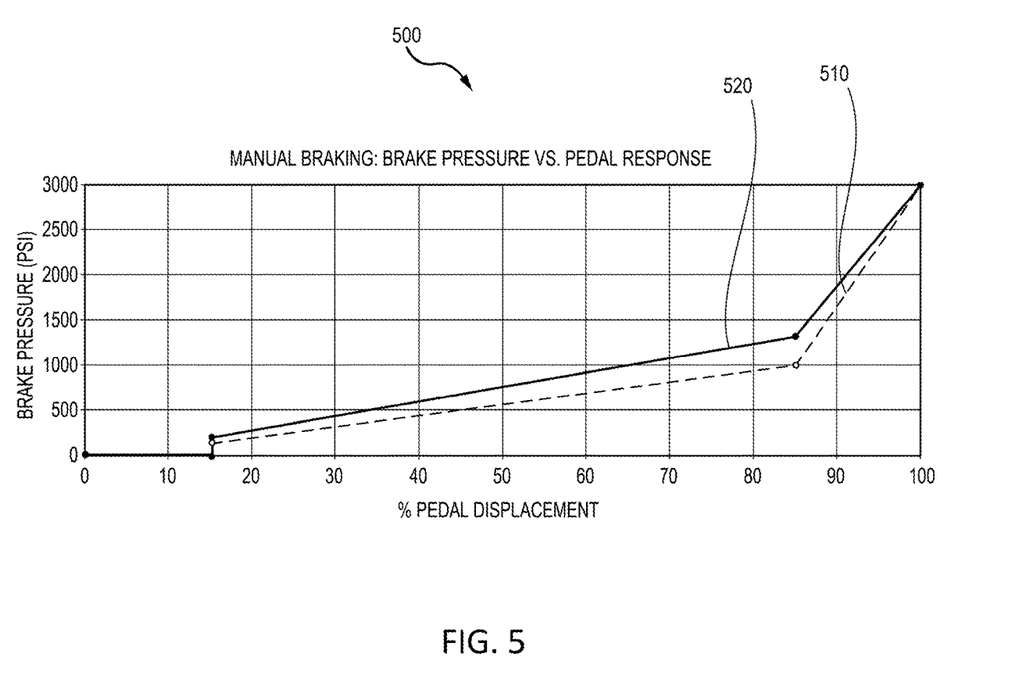
FIG. 5 illustrates a brake pressure vs. pedal response curve for a taxiing method, in accordance with various embodiments

Referring now to FIG. 5, a plot of brake pressure as a function of pedal response for a braking system with all brakes active and eight total brakes (plot 510) compared to a braking system with only three brakes on each side (six total brakes) active (plot 520) is illustrated, in accordance with various embodiments. If only six of eight brakes are active, then the pedal pressure curve (e.g., plot 520) is scaled by a factor of eight over six, or approximately 1.33. In this regard, a similar pedal feel for a respective pilot will be experienced during taxiing while only the six of eight brakes are active for a range of pedal displacement (e.g., between 15% and 85%), in accordance with various embodiments.

Figure 6:
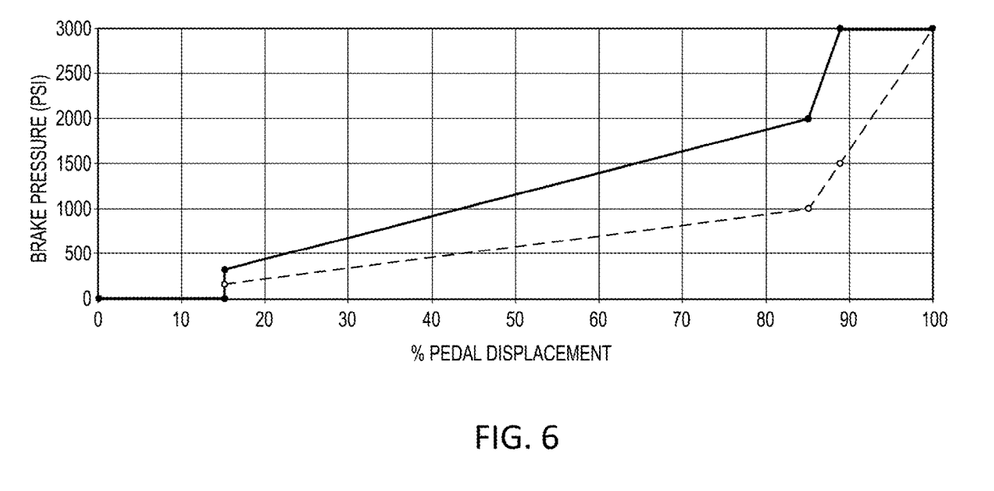
FIG. 6 illustrates a brake pressure vs. pedal response curve for a taxiing method, in accordance with various embodiments.
Figure 7:
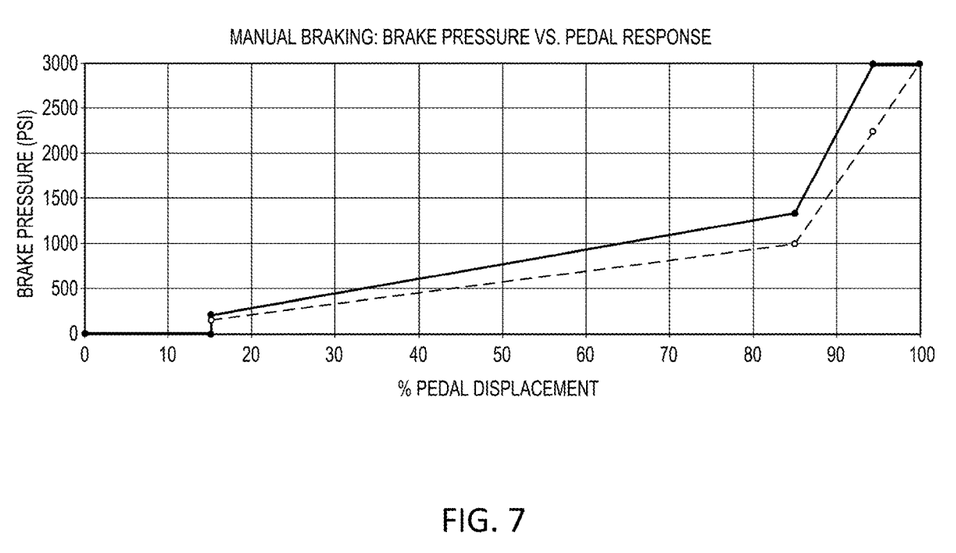
FIG. 7 illustrates a brake pressure vs. pedal response curve for a taxiing method, in accordance with various embodiments.

Although scaling in accordance with FIGS. 4 and 5 is likely sufficient for a majority of applications, the method and systems disclosed herein may be further refined. For example, with reference now to FIGS. 6 and 7, a further refined version of a braking system from FIG. 4 (FIG. 6) and a further refined version of a braking system from FIG. 5 (FIG. 7) are illustrated, in accordance with various embodiments. As illustrated in FIGS. 6 and 7, scaling a supply pressure may be applied relative to pedal displacement until a maximum supply pressure is reached. Once the maximum supply pressure is reached, the supply pressure will remain constant (i.e., at the maximum supply pressure) until 100% pedal deflection is achieved.

Figure 8:
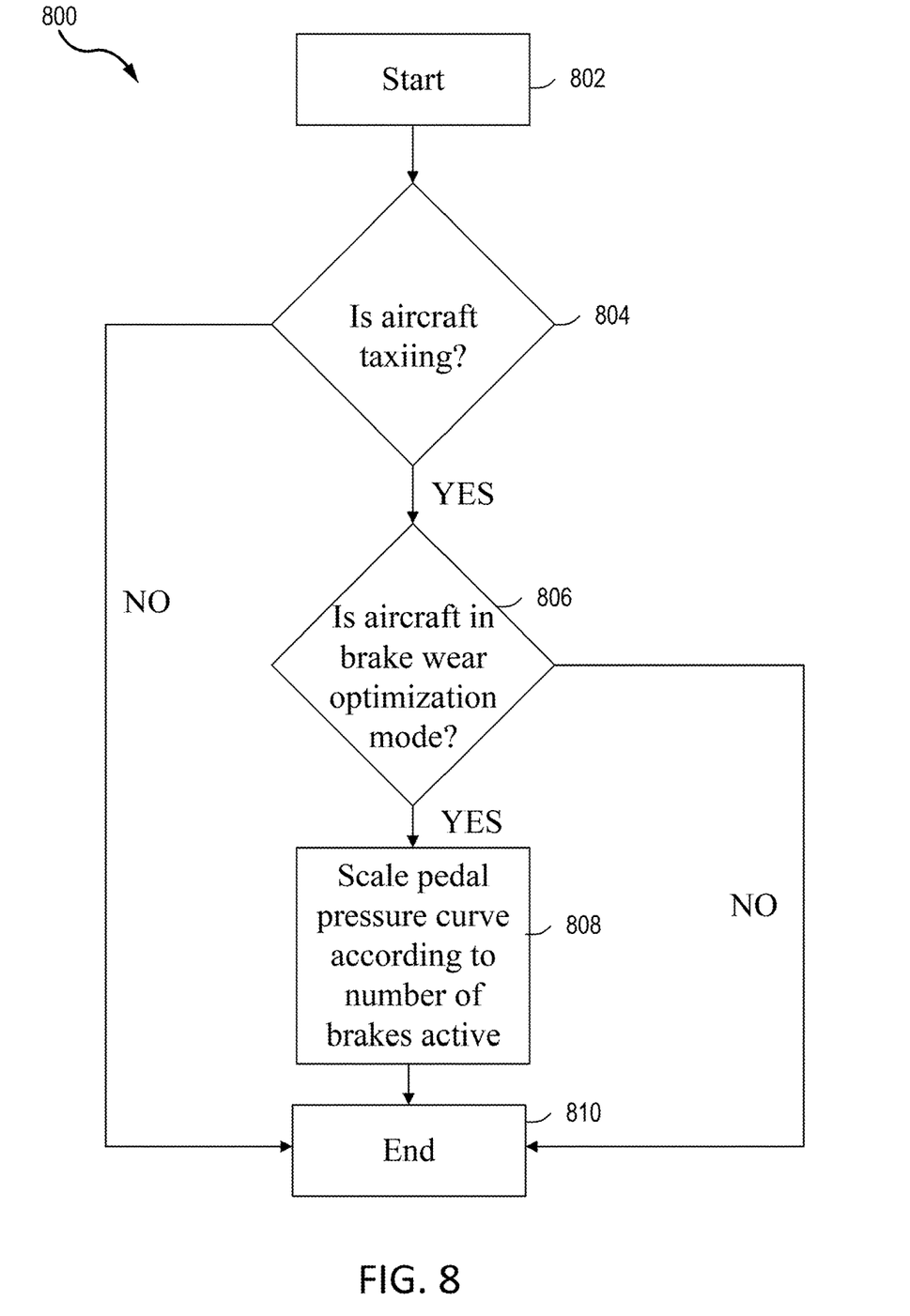
FIG. 8 illustrates a process for controlling a brake, in accordance with various embodiments.

Referring now to FIG. 8, a process 800 for performing a feel adjustment braking method (e.g., via a BCU 210 from FIG. 2 or BCU 310 from FIG. 3) is illustrated, in accordance with various embodiments. The process starts in start block 802 and proceeds to determine, via a processor, whether the aircraft is taxiing (step 804). For example, the BCU 210, 310 may make this determination in response to receiving an aircraft speed from a speed sensor or the like and comparing the aircraft speed to a predetermined threshold. For example, the BCU 210, 310 may determine the aircraft is taxiing in response to an aircraft speed being between 5 knots and 35 knots, or between 10 knots and 30 knots, in accordance with various embodiments. In various embodiments, the BCU 210, 310 may determine the aircraft 1 from FIG. 1 is on the ground in response to receiving an indication that landing gear both have a weight on wheels from weight on wheel sensors in communication with the BCU 210, 310. If the process 800 determines the aircraft is taxiing, the process proceeds to step 806. If the process 800 determines the aircraft is not taxiing, the process ends at step 810.

The process 800 further comprises determining whether a brake wear optimization mode is active (step 806). A "brake wear optimization mode" as referred to herein is any brake configuration where a number of brakes active during a taxiing event is fewer than the total number of brakes that could be active for the taxiing event. If the process 800 determines the aircraft is in a brake wear optimization mode, the process proceeds to step 808. If the process determines the aircraft is not in the brake wear optimization mode, the process ends at step 810 and proceeds to supply normal typical pressure as a function of pedal displacement.

The process 800 further comprises scaling a pedal pressure curve (e.g., FIGS. 4-7) based on a number of brakes active relative to the total number of brakes (step 808). Thus, in various embodiments, the systems and methods disclosed herein, for the same pedal displacement, regardless of taxi brake mode, allow a pilot to have feel a similar amount of brake force on a gear of a pedal since a torque provided by the brakes is roughly proportional to brake pressure. Although fewer brakes are active, more pressure is applied to active brakes providing an equivalent amount of torque on a LMLG 12 and RMLG 14 from FIG. 1. Thus, pilots may experience a response feel that they are used to when all brakes are operational, in accordance with various embodiments.

In various embodiments, the pilot does not compensate with extra pedal deflection to get an expected deceleration of an aircraft for a given pedal deflection in response to being in a brake wear optimization mode. In this regard, the systems and methods disclosed herein provide a consistent feel of the brake system to the pilot and avoid a concern a pilot may have that the brake system is not reacting as expected.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of taxiing an aircraft, the method comprising:
   determining, via a controller, whether the aircraft is taxiing with fewer brakes active than a total number of brakes;
   determining a total number of active brakes relative to the total number of brakes;
   determining a ratio of the total number of brakes to the total number of active brakes; and
   modifying, via the controller and through a modifying step, one of a brake pressure or a brake force supplied to an active brake of the aircraft as a function of pedal deflection in response to determining the aircraft is taxiing with fewer brakes active relative to the total number of brakes, wherein the modifying step further comprises:
   scaling the brake pressure or the brake force over a predetermined range of pedal displacement based on the ratio of the total number of brakes to the total number of active brakes,
   maintaining an initial range of pedal displacement, and one of:
      converging an end range of pedal displacement to at least one of a maximum supply pressure or a maximum brake force, or
      once the maximum supply pressure or the maximum brake force is reached based on the scaling, the brake pressure or the brake force remains constant until 100% pedal deflection is achieved.

2. The method of claim 1, wherein modifying the brake pressure further comprises commanding a first brake pressure be supplied at a first pedal displacement to the active brake that is greater than a second pressure that is supplied at the first pedal displacement of the active brake in response to the total number of brakes being active.

3. The method of claim 1, wherein the predetermined range of pedal displacement is above an idle pedal threshold.

4. The method of claim 1, wherein modifying the brake force further comprises commanding a first brake force be supplied at a first pedal displacement to the active brake that is greater than a second force that is supplied at the first pedal displacement of the active brake in response to the total number of brakes being active.

5. The method of claim 1, further comprising scaling the brake pressure supplied to the active brake based on the ratio of the number of active brakes relative to a total pressure.

6. An article of manufacture including a tangible, non-transitory computer-readable storage medium having instructions stored thereon that, in response to execution by one or more processors, cause the one or more processors to perform operations comprising:
   determining, by the one or more processors, that a number of active brakes are fewer than a total number of brakes for an aircraft during a taxiing event;
   determining, by the one or more processors, the number of active brakes relative to the total number of brakes;
   determining, by the one or more processors, a ratio of the number of active brakes relative to the total number of brakes and
   modifying, by the one or more processors and through a modifying step, one of a brake pressure or a brake force supplied to an active brake in the number of active brakes as a function of pedal displacement based on the ratio of the number of active brakes relative to the total number of brakes, wherein the modifying step further comprises:
   scaling the brake pressure over a predetermined range of pedal displacement based on a ratio of the total number of brakes to a total number of active brakes, maintaining an initial range of pedal displacement, and one of:
      converging an end range of pedal displacement to at least one of a maximum supply pressure or maximum brake force, or
      once the maximum supply pressure or the maximum brake force is reached, at least one of the brake pressure or the brake force remains constant until 100% pedal deflection is achieved.

7. The article of manufacture of claim 6, wherein the brake pressure is scaled over a range of pedal displacements.

8. The article of manufacture of claim 6, wherein the brake pressure supplied to the active brake for a first pedal displacement of a first pedal is equal to a second brake pressure supplied to a second active brake for a second pedal displacement of a second pedal in response to the first pedal displacement being equal to the second pedal displacement.

9. The article of manufacture of claim 6, wherein the operations further comprising determining whether the aircraft is taxiing.

10. The article of manufacture of claim 6, wherein modifying the brake force further comprises commanding a first brake force be supplied at a first pedal displacement to the active brake that is greater than a second force that is supplied at the first pedal displacement of the active brake in response to the total number of brakes being active.

11. A system, comprising:
a plurality of brakes including:
a left landing gear outboard brake coupled to a left landing gear of an aircraft;
a left landing gear inboard brake coupled to the left landing gear of the aircraft;
a right landing gear outboard brake coupled to a right landing gear of the aircraft;
a right landing gear inboard brake coupled to the right landing gear of the aircraft; and
a brake control unit (BCU) comprising one or more processors, the BCU in electronic communication with the plurality of brakes, wherein the BCU performs operations comprising:
determining, by the BCU, that at least one of the plurality of brakes is inactive;
determining, by the BCU, a number of active brakes relative to a total number of the plurality of brakes;
determining, by the BCU, a ratio of the number of active brakes relative to a total number of brakes; and
modifying, by the BCU and through a modifying step, one of a brake pressure or a brake force supplied to each active brake in a plurality of active brakes as a function of pedal displacement based on the ratio of the number of active brakes relative to the total number of brakes, wherein the modifying step further comprises:
scaling, by the BCU, the brake pressure over a predetermined range of pedal displacement based on the ratio of the total number of brakes to a total number of active brakes,
maintaining, by the BCU, an initial range of pedal displacement, and
one of:
converging an end range of pedal displacement to at least one of a maximum supply pressure or maximum brake force, or
once the maximum supply pressure or the maximum brake force is reached, at least one of the brake pressure or the brake force remains constant until 100% pedal deflection is achieved.

12. The system of claim 11, wherein the BCU is further configured to determine that the at least one of the plurality of brakes is inactive to improve wear performance.

13. The system of claim 11, wherein the BCU is further configured to determine that at least two of the plurality of brakes are inactive.

14. The system of claim 11, wherein the brake pressure is scaled over a predetermined range of pedal displacements.

15. The system of claim 11, wherein the operations further comprise determining the aircraft is taxiing.

16. The system of claim 11, wherein the operations further comprise reverting to a typical braking operation in response to each brake in the plurality of brakes becoming active.

* * * * *